United States Patent
Chang

(10) Patent No.: US 10,764,639 B2
(45) Date of Patent: Sep. 1, 2020

(54) OVERLAYING AGGREGATED MEDIA CONTENT WITH ADDITIONAL SERVICES BASED ON A CONTEXT

(71) Applicant: Telegenic, Inc., Mapleton, UT (US)

(72) Inventor: Sun Chang, Bellevue, WA (US)

(73) Assignee: Telegenic, Inc.

( * ) Notice: Subject to any disclaimer, the term of this patent is extended or adjusted under 35 U.S.C. 154(b) by 0 days.

(21) Appl. No.: 16/126,527

(22) Filed: Sep. 10, 2018

(65) Prior Publication Data

US 2019/0082213 A1 Mar. 14, 2019

Related U.S. Application Data

(60) Provisional application No. 62/556,347, filed on Sep. 9, 2017, provisional application No. 62/556,349, filed
(Continued)

(51) Int. Cl.
*H04N 7/16* (2011.01)
*H04N 21/462* (2011.01)
(Continued)

(52) U.S. Cl.
CPC ..... *H04N 21/4622* (2013.01); *H04L 65/4069* (2013.01); *H04L 65/4084* (2013.01); *H04L 67/12* (2013.01); *H04N 21/42204* (2013.01); *H04N 21/433* (2013.01); *H04N 21/4312* (2013.01); *H04N 21/43615* (2013.01); *H04N 21/472* (2013.01); *H04N 21/482* (2013.01); *H04N 21/4825* (2013.01); *H04N 21/6112* (2013.01); *H04N 21/6125* (2013.01);
(Continued)

(58) Field of Classification Search
CPC ........... H04N 21/4622; H04N 21/6112; H04N 21/482; H04N 21/472; H04N 21/43615; H04N 21/6125; H04N 21/42204; H04N 21/433; H04N 21/4312; H04N 21/814; H04N 21/4825; H04N 21/4331; H04N 21/64322; H04N 21/458; H04N 21/812; H04N 21/4532
USPC ........................................................ 725/142
See application file for complete search history.

(56) References Cited

U.S. PATENT DOCUMENTS 10,171,879 B2 * 1/2019 Boudreau ........ H04N 21/47214
10,225,623 B2 * 3/2019 Holden ................ H04N 21/814
(Continued)

*Primary Examiner* — Michael B. Pierorazio
(74) *Attorney, Agent, or Firm* — Ongs Law Firm, PLLC; Jacob C. Ong

(57) ABSTRACT

A computer system including a processor, a system memory, a non-transitory storage medium having modules such as a broadcast obtain module, an other media obtain module, a content aggregate module, an aggregated content send module, a context determine module, a formulate overlay module, and an overlay send module. The system may have a Wi-Fi router. The context determine module may determine a function or access services. The context determine module may access a calendar item for a user. The formulate overlay module may overlay data based on a calendar item. The formulate overlay module may overlay data relevant to aggregated content. A social media access module accessing a number of relevant services and a notice module providing notice to a user may be included. The notice module may identify the notice by using a date, a time, and a location of the computer system.

8 Claims, 10 Drawing Sheets

Related U.S. Application Data on Sep. 9, 2017, provisional application No. 62/556,351, filed on Sep. 9, 2017.

(51) Int. Cl.
| | |
|---|---|
| *H04N 21/482* | (2011.01) |
| *H04N 21/81* | (2011.01) |
| *H04N 21/61* | (2011.01) |
| *H04L 29/06* | (2006.01) |
| *H04N 21/472* | (2011.01) |
| *H04N 21/436* | (2011.01) |
| *H04N 21/431* | (2011.01) |
| *H04N 21/433* | (2011.01) |
| *H04L 29/08* | (2006.01) |
| *H04N 21/422* | (2011.01) |
| *H04N 21/6587* | (2011.01) |
| *H04N 21/45* | (2011.01) |
| *H04N 21/458* | (2011.01) |
| *G06F 3/0481* | (2013.01) |
| *G06F 3/0484* | (2013.01) |
| *H04N 21/643* | (2011.01) |

(52) U.S. Cl.
CPC ....... *H04N 21/6587* (2013.01); *H04N 21/814* (2013.01); *G06F 3/0481* (2013.01); *G06F 3/0484* (2013.01); *H04N 21/4331* (2013.01); *H04N 21/458* (2013.01); *H04N 21/4532* (2013.01); *H04N 21/64322* (2013.01); *H04N 21/812* (2013.01)

(56) References Cited

U.S. PATENT DOCUMENTS

| | | | |
|---|---|---|---|
| 10,264,297 B1* | 4/2019 | Gang | H04N 21/235 |
| 2007/0124756 A1* | 5/2007 | Covell | G06F 16/683 |
| | | | 725/18 |
| 2016/0323643 A1* | 11/2016 | Panchaksharaiah | H04N 21/44016 |
| 2017/0094349 A1* | 3/2017 | Maughan | H04N 21/44204 |

* cited by examiner

OVERLAYING AGGREGATED MEDIA CONTENT WITH ADDITIONAL SERVICES BASED ON A CONTEXT

CROSS-REFERENCE TO RELATED APPLICATIONS

This application claims priority from U.S. patent application Ser. No. 62/556,347, filed on Sep. 9, 2017, which is incorporated in its entirety as if fully set forth herein. This application also claims priority from U.S. patent application Ser. No. 62/556,349, filed on Sep. 9, 2017, which is incorporated in its entirety as if fully set forth herein. This application also claims priority from U.S. patent application Ser. No. 62/556,351, filed on Sep. 9, 2017, which is incorporated in its entirety as if fully set forth herein.

TECHNICAL FIELD

The disclosure generally relates to a computer system for providing content to a user. Specifically, the disclosure relates to an interactive interface to allow a user to select content from a plurality of sources.

BACKGROUND

Entertainment devices have the ability to obtain content from a variety of sources. Content may come from broadcast television providers, Internet service providers, or local storage mediums. Users with a variety of content sources may check each content source individually to identify a viewing option.

BRIEF SUMMARY

A computer system includes a processor; system memory, and a non-transitory storage medium. The non-transitory storage medium storing a number of modules, each module, when executed by the processor, causes the computer system to perform a particular task. The non-transitory storage medium includes a broadcast obtain module, an other media obtain module, a content aggregate module, an aggregated content send module, a context determine module, a formulate overlay module, and an overlay send module. The broadcast obtain module obtains broadcast content. The other media obtain module obtains other media content over the Internet via network communication. The content aggregate module aggregating the television content and the other media content into aggregated content. The aggregated content send module sending the aggregated content over a network to the device for presentation at the graphical user interface. The content determine module determining a context for the device. The formulate overlay module formulating an overlay from additional relevant services. The overlay send module sending the overlay to the device for presentation along with the aggregated content at the graphical user interface.

A computer program product includes a broadcast obtainer, an other media obtainer, a content aggregator aggregating, an aggregated content sender, a context determiner, an overlay formulator, and an overlay sender. The broadcast obtainer obtains broadcast content. The other media obtainer obtains other media content over an Internet via network communication. The content aggregator aggregates the television content and the other media content into aggregated content. The aggregated content sender sends the aggregated content over a network to the device for presentation at the graphical user interface. The context determiner determines a context for the device. The overlay formulator formulates an overlay from additional relevant services. The overlay sender sends the overlay to the device for presentation along with the aggregated content at the graphical user interface.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to apparatus, devices, methods, systems, and computer program products for overlaying aggregated media content with additional services based on a context. The present invention generally relates to systems and methods for aggregating access to and delivery of media content over a network. More specifically, access to and delivery of media content from a plurality of different content sources, such as, for example, over-the-air Television (TV), over-the-top content, and on demand content can be aggregated over a graphical user interface (GUI). An overlay of other relevant services (e.g., advertisements, social media content, calendar items, etc.) can displayed along with aggregated content over the graphical user interface (GUI).

The importance of Cable television is waning. With the rise of newer options from Netflix, Amazon, Sling, Sony, Hulu, as well as channel-specific distributions such as HBO Go, the age of bundled and unwanted services may be approaching an end. Indeed, more cable subscribers are cutting out the middle man in order to subscribe to individualized packages of particular content and/or platforms. Unbundling of content services advantageously permits users to customize their content. However, unbundling also increases the difficulty of and poses technical challenges in accessing and presenting media content from different sources. For example, it may be difficult to seamlessly access and present over-the-air channels, music, video on demand, social media data, Internet Protocol Television (IPTV), and gaming. Accordingly, aspects of the invention can be used to effectively aggregate access to and delivery of (e.g., customizable) media content for a user, across many end user devices.

In this description and the following claims, an "aggregator" is defined as hardware and/or software that interoperates to aggregate access to and delivery of media content via a display device. In some aspects, an aggregator is a general purpose computer, such as, for example, a Personal Computer (PC), tablet, mobile device or phone, or a specialized computer, such as, for example, a set top box, TV stick, or other thin client utilizing various operating system(s) and software for aggregating access to and delivery of media content to a user locally via a display device. In other aspects, an aggregator is an application server including services for aggregating access to and delivery of media content to a user over a network (e.g., the Internet). An aggregator can be used to render a seamless GUI that aggregates access to a plurality of different content sources.

Local Aggregation

Figure 1:
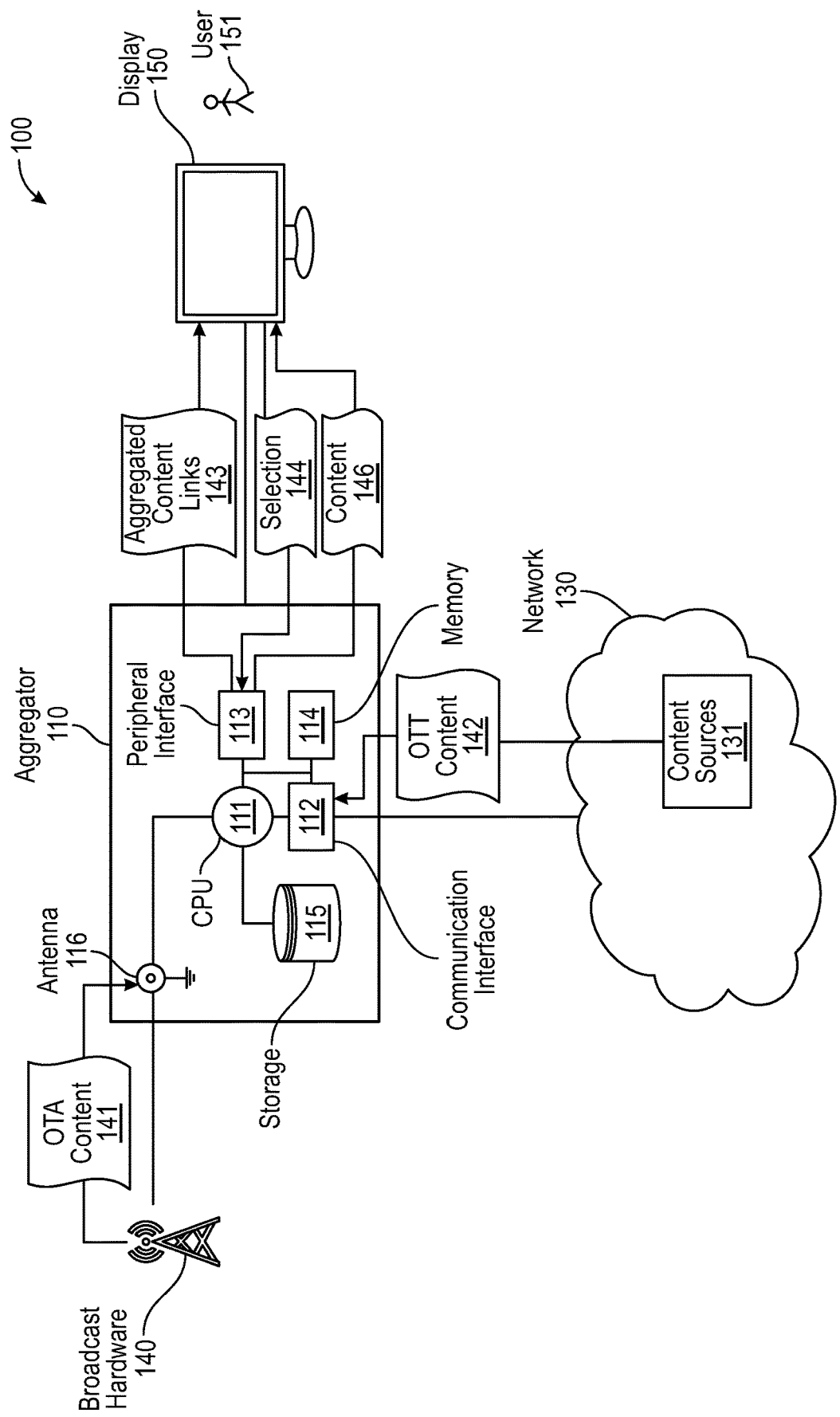
FIG. 1 illustrates an example architecture that facilitates providing aggregated access to and delivery of media content locally.

FIG. 1 illustrates an example architecture 100 for providing aggregated access to and delivery of media content locally. As depicted, computer architecture 100 includes aggregator 110, network 130, over-the-air broadcast hardware 140, and display 150. Aggregator 110 can be deployed locally as a local media player and media content aggregator. Aggregator 110 can aggregate access to and delivery of media content from multiple sources.

As depicted, aggregator 110 includes CPU 111, communication interface 112, peripheral interface 113, memory 114, and antenna 116.

Over-the-air broadcast hardware can broadcast over-the-air (OTA) content 141. Antenna 116 can receive OTA content 141. Alternately, antenna 116 can be external to aggregator 110. Antenna 116 can receive OTA content 141 and OTA content 141 can be transferred to aggregator 110 via coaxial cable. Antenna 116 can be compatible for receiving one or more of: NTSC, ATSC, DVB-T and DVB signals.

Network 130 can be a local area network (LAN), wide area network (WAN) or even the Internet. Network 130 includes content sources 131. Content sources 131 can send (e.g., stream) over-the-top (OTT) content 142 to aggregator 110. Communication interface 112 can receive OTT content 142 from content sources 131.

OTA content 141 or portions thereof and/or OTT content 142 or portions thereof can be transmitted through peripheral interface 113 to display 150. Peripheral interface 113 can include an HDMI, DVI, VGI, DisplayPort, component, composite, S-Video, CoaXPress, HDBaseT, DiiVA, MHL, or other equivalent cable, WiFi, NFC, and other communication mechanisms known to those skilled in the art.

Additional connectors of aggregator 110 may comprise USB, RCA, RJ45, COAX, and interfaces for various input devices including but not limited to remotes and keyboards. User 151 can use the input devices to send input to aggregator 110.

Communication interface 112 can include a LTE chip or other equivalent cellular chip (e.g., WiMax, CDMA, EDGE, 5G, GPRS, GSM, etc.) for wireless communications and broadband access. Communication interface 112 can also include a Wi-Fi interface, a Bluetooth interface, or wired (e.g., Ethernet) interface.

Aggregator 110 can also include components for amplifying and/or control signals, including signals received via antenna 116.

Aggregator 110 can include an operating system, such as, for example, Android, iOS, Windows, Linux, etc. Aggregator 110 can include telephony components and input/output for providing voice over IP services. Aggregator 110 can a digital video recorder (DVR) or personal video recorder (PVR) to record various media content (e.g., stored in storage 115). The recorder can be structured and configured to capture a plurality of streams or content simultaneously.

In one aspect, aggregator 110 supports a plurality of antennas for separately receiving authorized content to separate residents living in close proximity.

Aggregator 110 can formulate links for accessing different content (e.g., different channels) in OTA content 141. Aggregator 110 can also formulate links for accessing content from different content sources (e.g., different applications, network locations, etc.) in OTT content 142. Aggregator 110 can aggregate the formulated links in aggregated content links 143. For example, aggregated links 143 can include links for one or more channels of OTA content 141 and links for one or more of content sources 131 (e.g., one or more applications, one or more network locations, etc.). Aggregator 110 can present aggregated content links 143 at display 150 through peripheral interface 113 (e.g., in a content (channel) guide).

User 151 can make selection 144 (of one or more of aggregated content links 143). Selection 144 can be sent to aggregator 110 through peripheral interface 113. Aggregator 110 can identify content 146 corresponding to any selected link. Aggregator 110 can send content 146 to display 150 through peripheral interface 113.

In one aspect, selection 144 selects multiple links from aggregated content links 143. Aggregator 110 identifies a content source corresponding to each selected link. Aggregator 110 aggregates the content from the identified content sources into content 146. For example, aggregator 110 can aggregate content from a channel of OTA content 141 and from an application of OTT content 142. Aggregator 110 can send aggregated content 146 to display 150 through peripheral interface 113.

Network Aggregation

Figure 2:
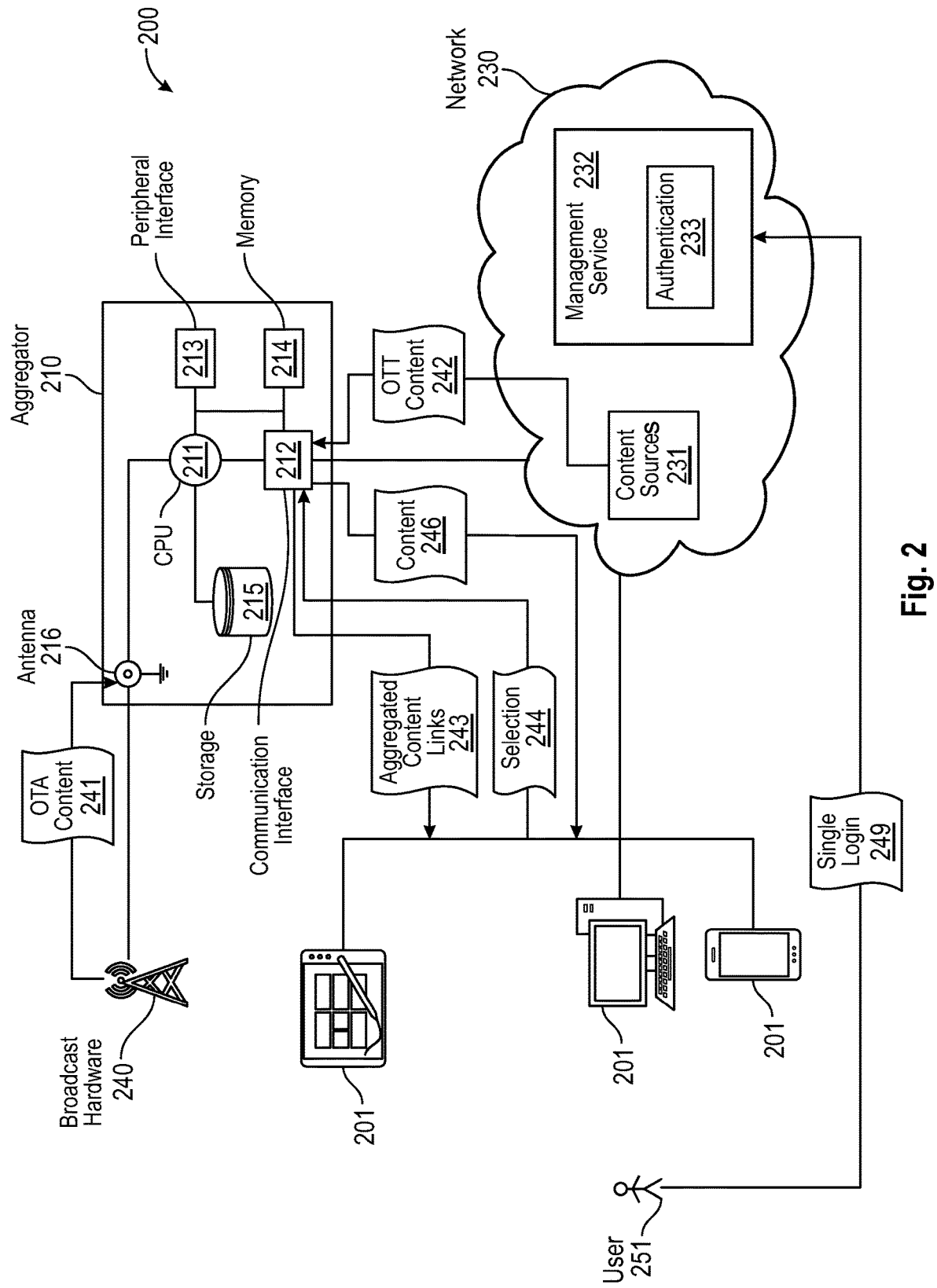
FIG. 2 illustrates an example architecture that facilitates providing aggregated access to and delivery of media content over a network.

FIG. 2 illustrates an example architecture 200 for providing aggregated access to and delivery of media content locally. As depicted, computer architecture 200 includes devices 201, aggregator 210, network 230, and over-the-air broadcast hardware 240. Aggregator 210 can aggregate access to and delivery of media content from multiple sources across multiple devices for multiple users.

As depicted, aggregator 210 includes CPU 211, communication interface 212, peripheral interface 213, memory 214, and antenna 216. In one aspect, aggregator 210 is included in a router that also provides wireless network connectivity to other devices.

Devices 201 can include a mobile device, a tablet, a computer, a wearable electronic device, or any other device or combination of circuits structured and configured to communicate with another device, computer, aggregator 210, etc. via Bluetooth or Wi-Fi connection.

Devices 201 may comprise application(s) and user interface(s) (front-end interface) that allows a user to interact with aggregator 201, content sources 231, and management service 232 as well as other servers, services and stored applications and programs thereon (back-end processing). The user interface may be proprietary and may comprise a custom developed mobile or desktop application(s). Alternatively, or in addition to, the user interface may comprise a web browser, mobile browser, or other application or executable code that allows for communication and visualization of information.

Over-the-air broadcast hardware can broadcast over-the-air (OTA) content 241. Antenna 216 can receive OTA content 241. Alternately, antenna 216 can be external to aggregator 210. Antenna 216 can receive OTA content 241 and OTA content 241 can be transferred to aggregator 210 via coaxial cable. Antenna 216 can be compatible for receiving one or more of: NTSC, ATSC, DVB-T and DVB signals.

Network 230 can be a local area network (LAN), wide area network (WAN) or even the Internet. Network 230 includes content sources 231 and management service 232.

Management service 232 can manage users that utilize content aggregation. For example, management service 232 can keep credentials for users that use subscription content sources. Management service 232 can login to subscription content sources on behalf of a user so that content from the subscription content sources can aggregated with other (e.g., OTA) content. As depicted, management service 232 includes authentication 233.

A user can perform a single login to manage service 232 using authentication 233. Once logged in, management service can then access subscription content on behalf of the logged in user. For example, user 251 can perform single login 249 with authentication 233. Accessed content sources can include content sources in content sources 231 for which user 251 has a subscription. A single login can include entering a PIN, biometric data (e.g., voice recognition, etc.), a password. In one aspect, a single login using multiple types of data, such as, for example, multiple forms of biometric data, a form of biometric data and a PIN, etc.

After user 251 is logged into management service 232, management service 232 can then access content (e.g., subscription) sources on behalf of user 251. For example, content sources 231 can send (e.g., stream) over-the-top (OTT) content 242 to aggregator 210 for user 251. Communication interface 212 can receive OTT content 242 from content sources 231. Communication interface 212 can include an LTE chip or other equivalent cellular chip (e.g., WiMax, CDMA, EDGE, 5G, GPRS, GSM, etc.) for wireless communications and broadband access. Communication interface 212 can also include a Wi-Fi interface, a Bluetooth interface, or wired (e.g., Ethernet) interface. OTA content 241 or portions thereof and/or OTT content 242 or portions thereof can be transmitted through communication interface 212 to a device 201.

Aggregator 210 can also include components for amplifying and/or control signals, including signals received via antenna 216.

Aggregator 210 can include an operating system, such as, for example, Android, iOS, Windows, Linux, etc. Aggregator 210 can include telephony components and input/output for providing voice over IP services. Aggregator 210 can a digital video recorder (DVR) or personal video recorder (PVR) to record various media content (e.g., stored in storage 215). The recorder can be structured and configured to capture a plurality of streams or content simultaneously.

In one aspect, aggregator 210 supports a plurality of antennas for separately receiving authorized content to separate residents living in close proximity.

Aggregator 210 can formulate links for accessing different content (e.g., different channels) in OTA content 241. Aggregator 210 can also formulate links for accessing content from different content sources (e.g., different applications, application servers, network locations, subscription services, etc.) in OTT content 242. Aggregator 210 can aggregate the formulated links in aggregated content links 243. For example, aggregated links 243 can include links for one or more channels of OTA content 241 and links for one or more of content sources 231 (e.g., one or more applications, one or more application servers, one or more network locations, subscription services, etc.). Aggregator 210 send aggregate content links through communication interface 212 over network 230 to a device 201.

The device 201 can present aggregated content links 243 at a display (e.g., in a content (channel) guide). User 251 can make selection 244 (of one or more of aggregated content links 143) at the device 201. The device 201 can send selection 244 over network 230 through communication interface 212 to aggregator 210. Aggregator 210 can identify content 246 corresponding to any selected link. Aggregator 210 can send content 146 through communication interface 212 over network 230 to the device 201.

In one aspect, selection 244 selects multiple links from aggregated content links 243. Aggregator 210 identifies a content source corresponding to each selected link. Aggregator 210 aggregates the content from the identified content sources into content 246. For example, aggregator 210 can aggregate content from a channel of OTA content 241 and from an application of OTT content 242. Aggregator 210 can send aggregated content 246 through communication interface 212 over network 230 to the device 201.

Accordingly, aspects of the invention include aggregating access to and presentation of media content based on a single authentication, wherein the media content includes over-the-air (terrestrial) content and Internet content.

In this description and the following claims an "application server" or "third party server" is defines as at least one computer having appropriate hardware and applications installed thereon for the provision of server services including web and other functional services described herein, such that a user may access, execute, and/or view the applications remotely from a device 201. More specifically, application servers or third party servers may comprise general purpose computers, specialized computers, or other hardware components structured and configured to receive, process, transmit, and store information to and from other devices.

Application servers or third party servers can be further configured with executable or interpretable computer code that facilitates performance the processes described within this application.

For example, in one aspect, aggregator 210 is an application or third party server comprising a central processing unit (CPU) 211, which may be a single core or multi core processor, memory 214 (random-access memory, read-only memory, and/or flash memory) or primary memory for high-speed storage of executing programs electronic storage unit 215 (e.g., hard disk) or secondary memory for storing data, communications interface 212 (e.g., a network adapter) for communicating with other devices or computers over a network, and/or peripheral device interface 113 in communication with the CPU 111 that enable input/output from aggregator 210.

Aggregator 210 can implement the aspects of the invention using any number of solution stacks (i.e., a set of software subsystems or components) known to an ordinary computer or web programmer skilled in the art. These solution stacks may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof known to those skilled in the art that allows a programmer to develop the methods and computer programs described within this application.

The software stack may be implemented with third-party cloud platforms, for example using load balancing and virtualization software provided by Citrix, Microsoft, VMware, Map-Reduce, Google Filesystem, Xen, memory caching software such as Memcached and Membase, structured storage software such as MySQL, MariaDB, XtraDB, etc. and/or other appropriate platforms, various packaged web services such as those provided by Amazon Web Services (AWS). Of course, these solution stacks may also be deployed in cloud platforms by using known development tools a server hosting services such as GitHub and Rackspace, as well as their equivalents.

Network 230 (or 130) may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network 230 (or 130) may comprise additional hardware components and/or devices appropriate for facilitating the transmission and communication between the various systems and devices of the present invention, such as those directed to integrated authentication, quality control or to improve content delivery such as via a content delivery network (CDN).

In one aspect, aggregator 210 is deployed on one or more computers as an installable software.

Various aspects of the present invention may be thought of as "products" or "articles of manufacture" typically in the form of machine (or processor) executable code, interpretable code, and/or associated data that is carried on or embodied in a machine readable medium. Machine-executable code can be stored on an electronic storage unit, such memory (e.g., read-only memory, random-access memory, flash memory) or a hard disk, as described above.

All or portions of the software may at times be communicated through the Internet or other communication networks. Such communications, for example, may enable loading of the software from one computer or processor onto another, for example, from a management server or host computer onto the computer platform of an application server, or from an application server onto a client computer or device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, tangible "storage" media, terms such as computer or machine "readable medium", refer to any medium that participates in providing instructions to a processor for execution. Further, the term "non-transitory" computer readable media includes both volatile and non-volatile media, including RAM. In other words, non-transitory computer media excludes transitory propagating signals per se, but includes at least register memory, processor cache, RAM, and equivalents thereof.

Therefore, a machine readable medium, such as computer executable code, may take many forms, including but not limited to, a tangible storage medium, a carrier wave medium or physical transmission medium. Non-volatile storage media include, for example, optical, magnetic, or solid state disks, such as any of the storage devices in any computer(s) or the like, such as may be used to house the databases. Volatile storage media include dynamic memory, such as main memory of such a computer platform. Tangible transmission media may include coaxial cables, copper wire and fiber optics, communication buses. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Aggregation Methods

Figure 3:
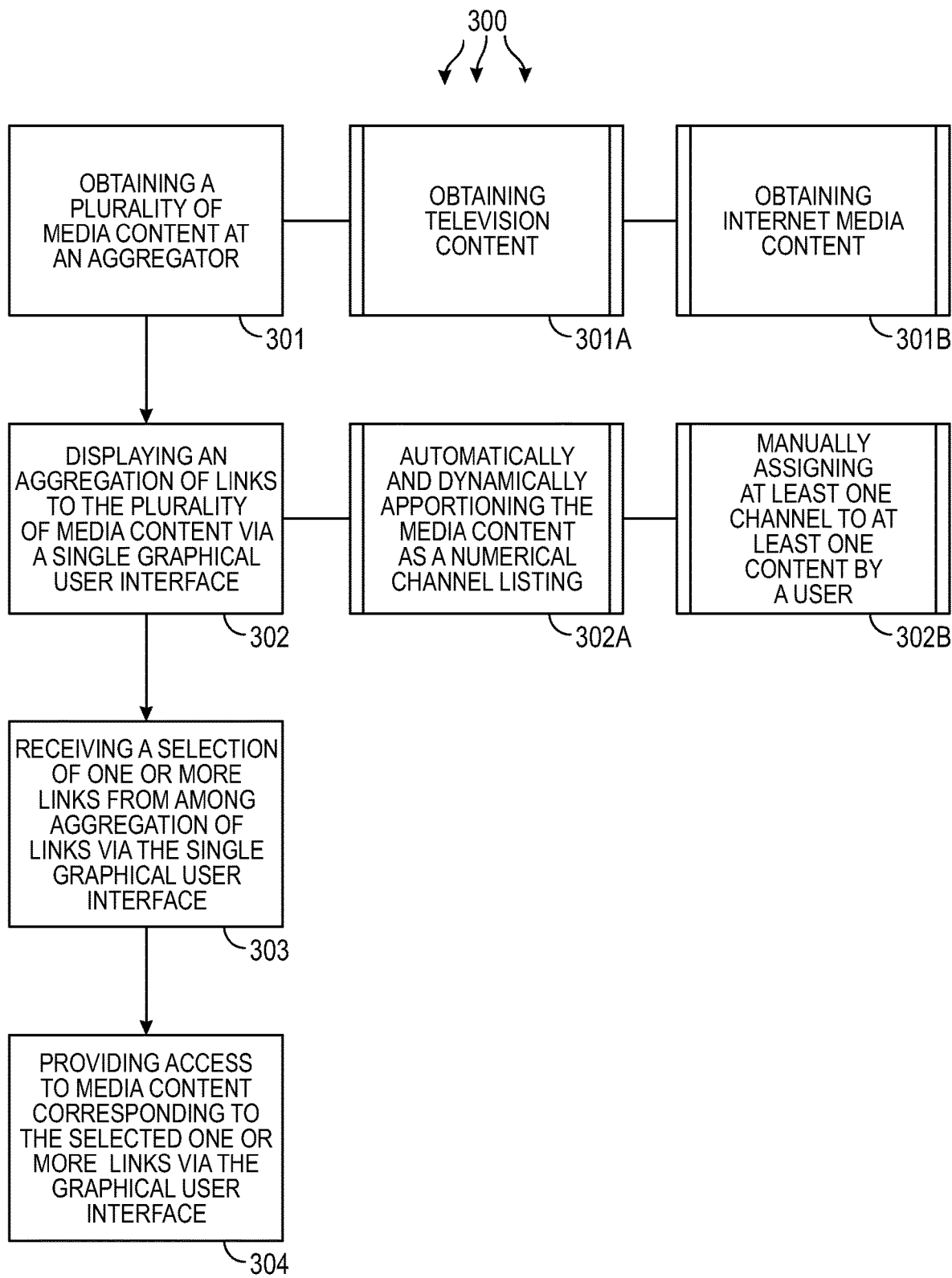
FIG. 3 illustrates a flow chart of an example method for aggregating access to and delivery of media content

FIG. 3 illustrates a flow chart of an example method 300 for aggregating access to and delivery of media content. Method 300 will be described with respect to the components and data in computer architectures 100 and 200.

Method 300 includes obtaining a plurality of media content at an aggregator (301). For example, aggregator 110 can obtain OTA content 141 and OTT content 142. Similarly, aggregator 210 can obtain OTA content 241 and OTT content 242. A plurality of content can include television content, Internet media content comprising live streams and/or pre-recorded content, gaming content, music content, media-on-demand content, other media content whether over-the-air signals, or by Internet or local networks, and/or combinations thereof. For example, television content may be obtained via a coaxial in to the aggregator deployed as a set top box or router, and Internet content may be spidered or crawled from the web, or may be updated or directed from a central application server service in communication with the aggregator.

Thus, method 300 can include obtaining television content (301A) and obtaining Internet media content (301B).

In one aspect, language consolidation and/or interpretation may be deployed as part of the aggregator.

In another aspect, a particular content may be associated with multiple locations, i.e. such as a major network having an affiliate in each major city. As such, the feeds for all cities or affiliates may be obtained at the aggregator by various communication mediums, and a user may select geographically which feed to display. In other embodiments, geolocation capability of a user's device may be detected automatically by the aggregator in order to display an appropriate and/or authorized stream to the user device.

Method 300 includes displaying an aggregation of links to the plurality of media content via a single graphical user interface (302). For example, aggregator 110 can display aggregated content links 143 on a GUI at display 150. Similarly, aggregator 210 can display aggregated content links 243 on a GUI at a device 201.

Figure 4:
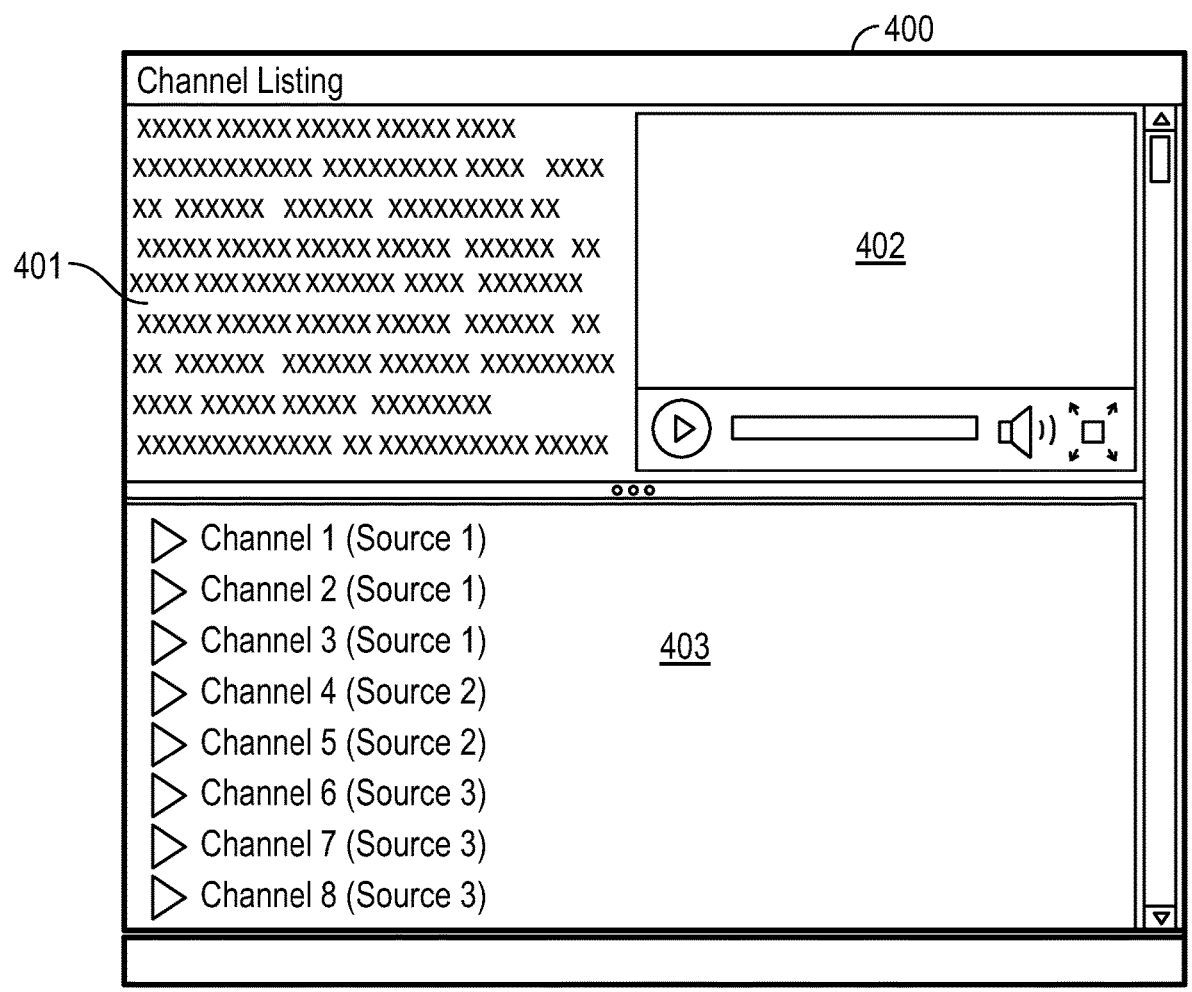
FIG. 4 illustrates an example wireframe of a graphical user interface for aggregating access to media content from a plurality of different sources.

FIG. 4 depicts an example graphical user interface in the form of hybrid channel guide 400. Hybrid channel guide 400 includes a media description portion 401, a media or video preview portion 402, and a channel or program listing 403 across a plurality of content sources. Hybrid channel guide 400 can include a numerical channel listing which may be segregated into channel blocks, may be sequential, and/or may be custom set by a user. Aggregated content links 143 and/or aggregated content links 243 can be arranged within a hybrid channel guide similar to hybrid channel guide 400.

In one aspect, method 300 includes automatically and dynamically apportioning the media content as a numerical channel listing (302A). For example, aggregator 110 can automatically and dynamically apportion OTA content 141 and OTT content 142 as a numerical channel listing in aggregated content links 143. Similarly, aggregator 210 can automatically and dynamically apportion OTA content 241 and OTT content 242 as a numerical channel listing in aggregated content links 243. A numerical channel listing can be automatically and dynamically apportioned by an aggregator as additional content becomes available and/or unavailable.

In another aspect, method 300 includes manually assigning at least one channel to at least one content by a user (302B). For example, user 151 can assign a channel in aggregated content links 143 for a portion of content in OTA content 141 or OTT content 142. Similarly, user 251 can assign a channel in aggregated content links 243 for a portion of content in OTA content 241 or OTT content 242.

In further aspects, different media content may be sorted categorically.

Method 300 includes receiving a selection of one or more links via the single graphical user interface (303). For example, aggregator 110 can receive selection 144 from user 151. Similarly, aggregator 210 can receive selected 244 from user 251.

Method 300 includes providing access to media content corresponding to the selected one or more links via the graphical user interface (304). For example, aggregator 110 can provide user 151 with access to (potentially aggregated) content 146. Similarly, aggregator 210 can provide user 251 with access to (potentially aggregated) content 246.

In one aspect, the plurality of media content may be accessible via the aggregator over the Internet, via the same or a separate graphical user interface. Accordingly, the aggregator n this embodiment may comprise server services as described and/or additional video or music streaming services accessible by a separate device in communication with the aggregator over the Internet or a local network.

Figure 5:
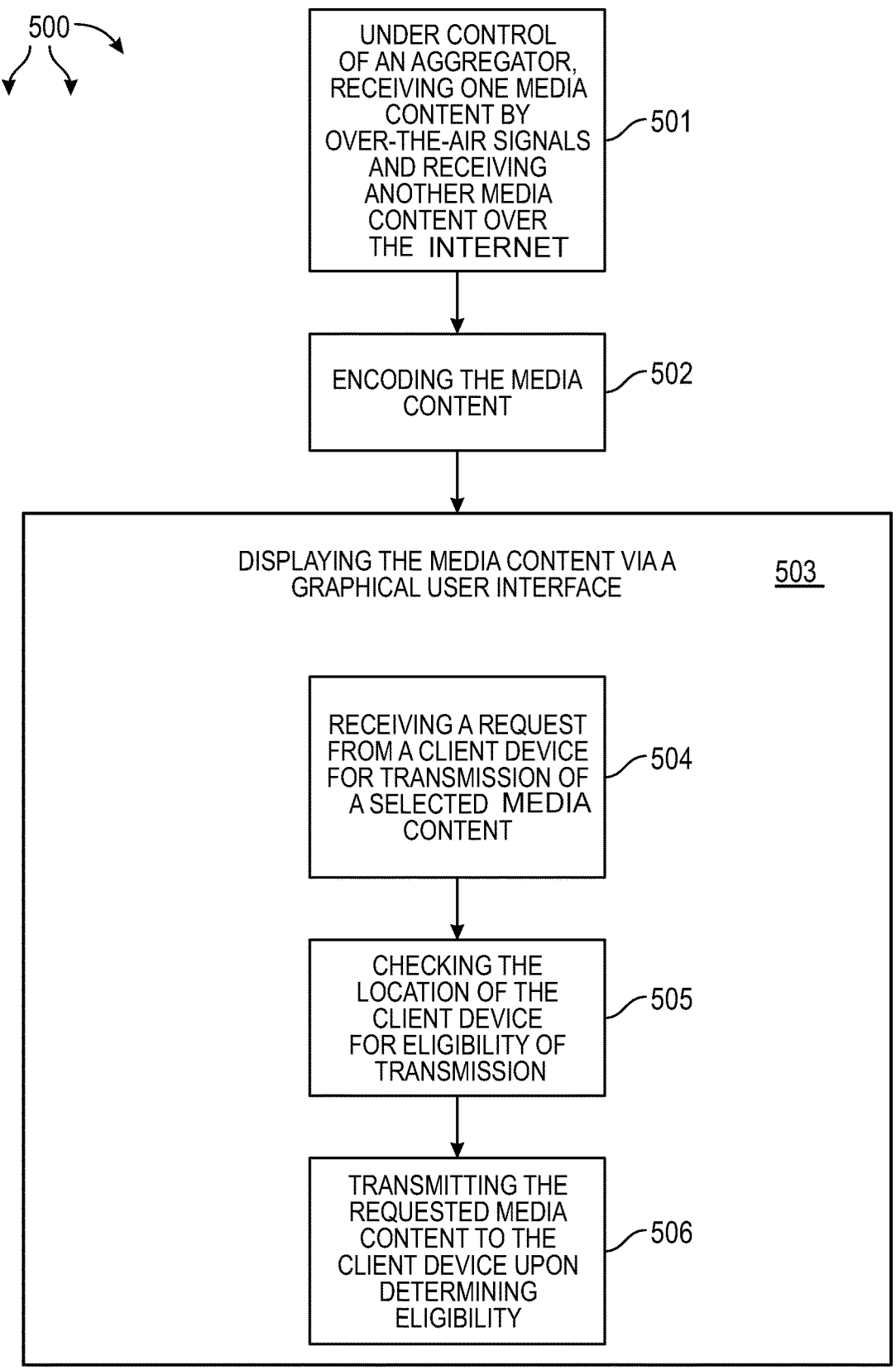
FIG. 5 illustrates a flow chart of another example method for aggregating access to and delivery of media content.

FIG. 5 illustrates a flow chart of an example method 500 for aggregating access to and delivery of media content. Method 500 can be implemented to aggregate media content from different content sources and provide the aggregated content over a network.

Method 500 includes under the control of an aggregator, receiving one media content by over-the-air signals and receiving another media content over the Internet (501). For example, aggregator 210 can receive OTA content 241 and OTT content 242. Method 500 includes aggregating and encoding the media content (502). For example, aggregator 210 can aggregate OTA content 241 and OTT content 242 together into content 146 and encode content 146. Aggregator 210 can encode content 246 such that it is decodable via a corresponding software and/or end user or client device.

Method 500 includes displaying media content via graphical user interface (503). For example, aggregator 210 can display aggregated content 246 at the device 201.

Displaying media content via graphical user interface can include receiving a request to display the media content over the internet via a graphical user interface (504). For example, aggregator 210 can receive selection 244 from a device 201. Selection 244 can be a selection of links requesting display of aggregated content 246 at the device 201. Displaying media content via graphical user interface can include checking the location of the client device for eligibility of transmission (505). For example, aggregator 210 can check the location of the device 201 for eligibility of transmission of aggregated content 246. Displaying media content via graphical user interface can include transmitting the requested media content to the client device upon determining eligibility (506). For example, aggregator 210 can transmit aggregated content 246 to the device 201 upon determining eligibility of the device 201.

Other aspects of the present invention relate to methods of providing an inclusive hardware and software solution as a service as an alternative to cable television. Accordingly, in one aspect an application server or router includes an aggregator for aggregating a plurality of media content as described above from the Internet and from various over-the-air signals across the globe (including UHF/VHF, ATSC, DVB, and other equivalent reception). Software at the application server or router may provide for metadata extraction tools, live linking methods to ensure Internet link validity.

In one aspect, a video game platform may be provided, for download, demoing, renting and/or purchasing various video games and/or apps.

Overlaying Other Services on Aggregated Media Content

Figure 6:
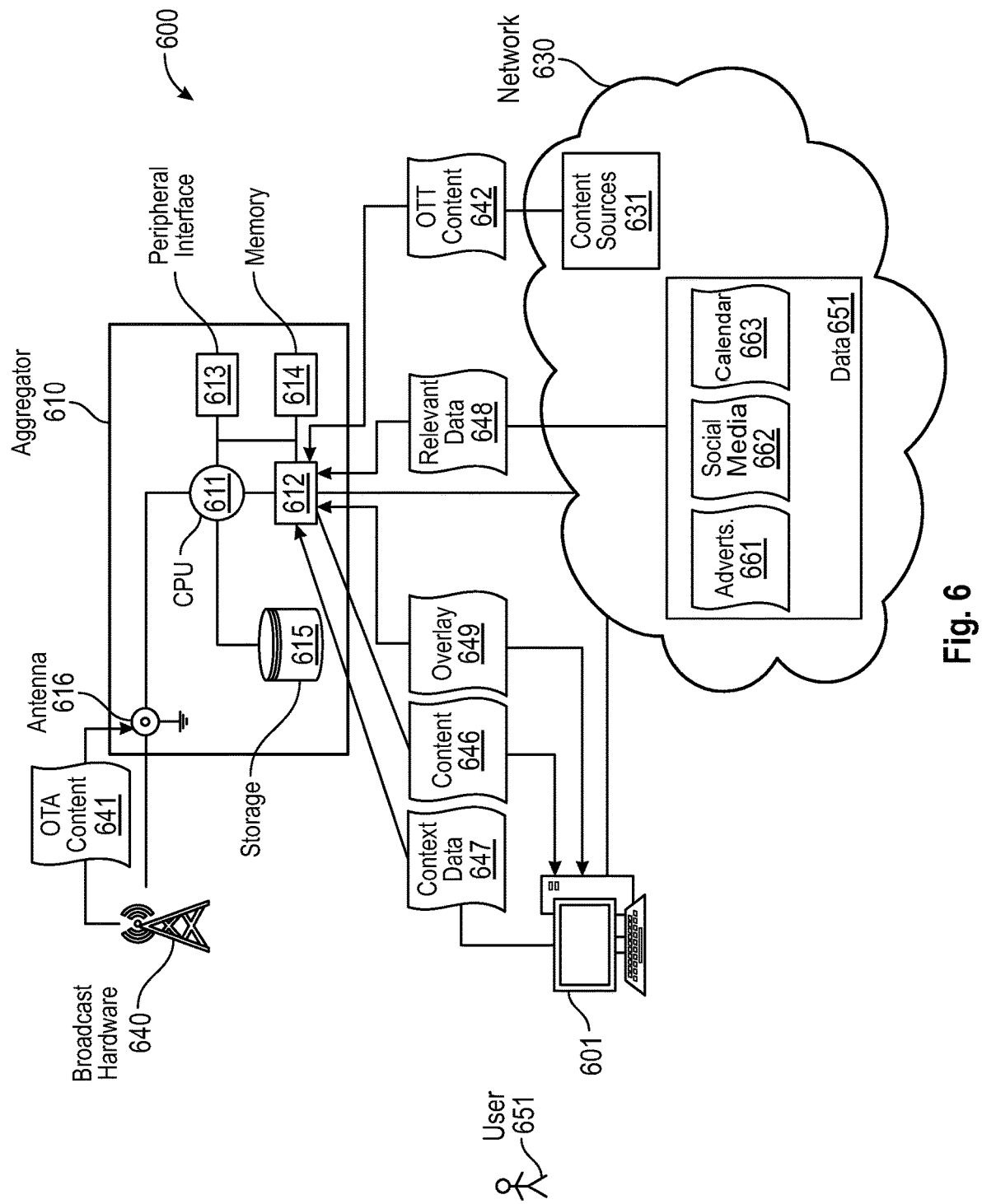
FIG. 6 illustrates an example architecture that facilitates overlaying other relevant services on aggregated media content at a graphical user interface.

FIG. 6 illustrates an example architecture 600 that facilitates overlaying other relevant services on aggregated media content at a graphical user interface. As depicted, computer architecture 600 includes device 601, aggregator 610, network 630, and over-the-air broadcast hardware 640. Aggregator 610 can aggregate access to and delivery of media content from multiple sources across multiple devices for multiple users. Aggregator 610 can also identify and present additional relevant services for overlaying aggregated media content.

As depicted, aggregator 610 includes CPU 611, communication interface 612, peripheral interface 613, memory 614, and antenna 616. In one aspect, aggregator 610 is included in a router that also provides wireless network connectivity to other devices.

Device 601 can include a mobile device, a tablet, a computer, a wearable electronic device, or any other device or combination of circuits structured and configured to communicate with another device, computer, aggregator 610, etc. via Bluetooth or Wi-Fi connection.

Device 601 may comprise application(s) and user interface(s) (front-end interface) that allows a user to interact with aggregator 610, content sources 631, and data 651 as well as other servers, services and stored applications and programs thereon (back-end processing). The user interface may be proprietary and may comprise a custom developed mobile or desktop application(s). Alternatively, or in addition to, the user interface may comprise a web browser, mobile browser, or other application or executable code that allows for communication and visualization of information.

Over-the-air broadcast hardware 640 can broadcast over-the-air (OTA) content 641. Antenna 616 can receive OTA content 641. Alternately, antenna 616 can be external to aggregator 610. Antenna 616 can receive OTA content 641 and OTA content 641 can be transferred to aggregator 610 via coaxial cable. Antenna 616 can be compatible for receiving one or more of: NTSC, ATSC, DVB-T and DVB signals.

Network 630 can be a local area network (LAN), wide area network (WAN) or even the Internet. Network 630 includes content sources 631 and data 651.

Communication interface 612 can receive OTT content 642 from content sources 631. Communication interface 612 can include a LTE chip or other equivalent cellular chip (e.g., WiMax, CDMA, EDGE, 5G, GPRS, GSM, etc.) for wireless communications and broadband access. Communication interface 612 can also include a Wi-Fi interface, a Bluetooth interface, or wired (e.g., Ethernet) interface. OTA content 641 or portions thereof and/or OTT content 642 or portions thereof can be transmitted through communication interface 612 to device 601.

Aggregator 610 can also include components for amplifying and/or control signals, including signals received via antenna 616.

Aggregator 610 can include an operating system, such as, for example, Android, iOS, Windows, Linux, etc. Aggregator 610 can include telephony components and input/output for providing voice over IP services. Aggregator 610 can a digital video recorder (DVR) or personal video recorder (PVR) to record various media content (e.g., stored in storage 615). The recorder can be structured and configured to capture a plurality of streams or content simultaneously.

In one aspect, aggregator 610 supports a plurality of antennas for separately receiving authorized content to separate residents living in close proximity.

In one aspect, aggregator 610 aggregates content from multiple content sources into content 646. For example, aggregator 610 can aggregate content from a channel of OTA content 641 and from an application of OTT content 642. Aggregator 610 can send aggregated content 646 through communication interface 612 over network 630 to device 601.

Data 651 can be used to formulate overlays for overlay presented aggregated content based on a context associated with device 601. As depicted, data 651 includes advertisements 661, social media data 662, and calendar items 663. The context can be information about user 651 and/or device 601, such as, for example, date, time, location, user preferences, social media connections, etc.

Figure 7:
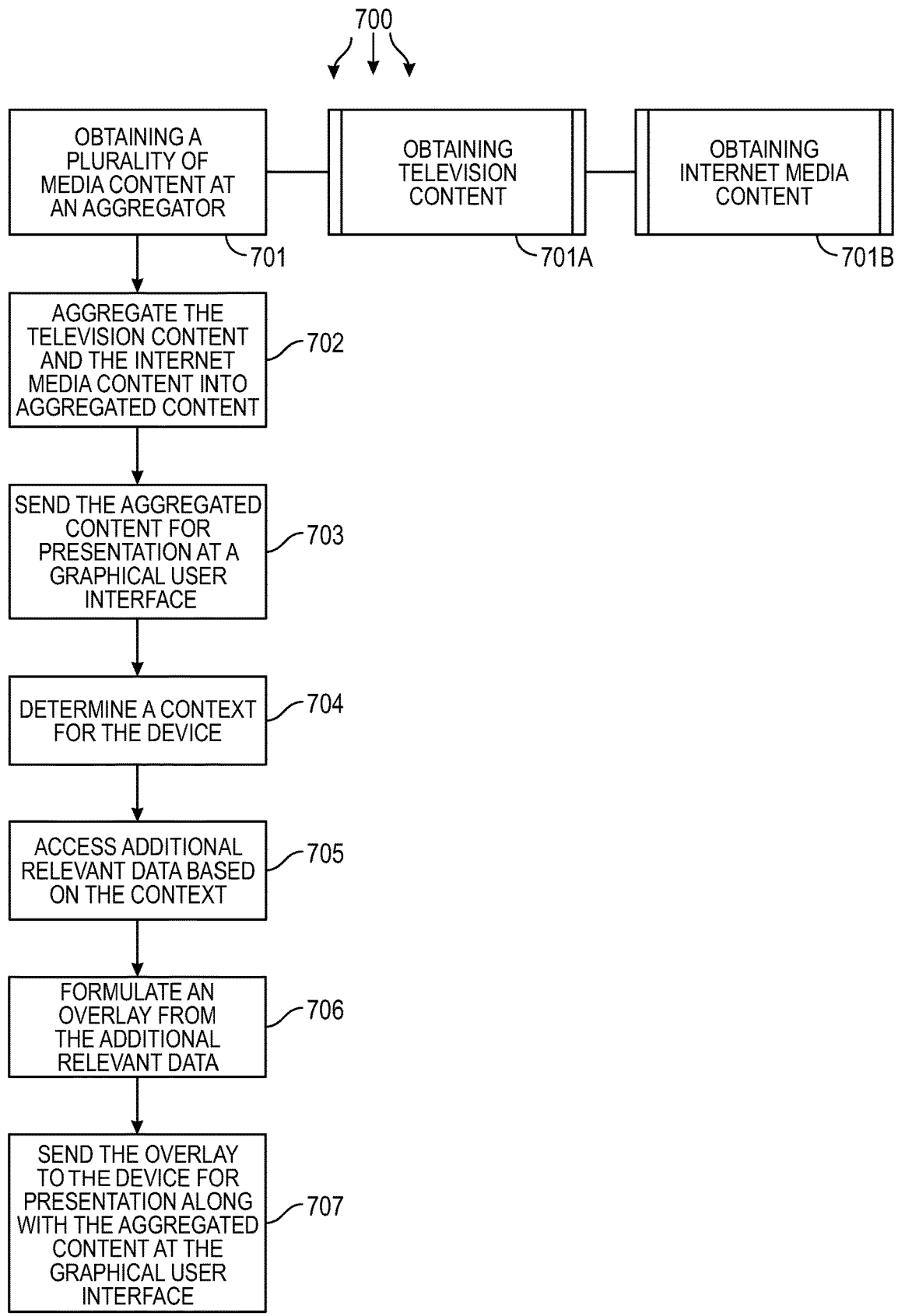
FIG. 7 illustrates a flow chart of an example method for overlaying other relevant services on aggregated media content at a graphical user interface.

FIG. 7 illustrates a flow chart of an example method 700 for overlaying other relevant services on aggregated media content at a graphical user interface. Method 700 will be described with respect to the components and data in computer architecture 600.

Method 700 includes obtaining a plurality of media content at an aggregator (701). For example, aggregator 610 can obtain OTA content 641 and OTT content 642. A plurality of content can include television content, Internet media content comprising live streams and/or pre-recorded content, gaming content, music content, media-on-demand content, other media content whether over-the-air signals, or by Internet or local networks, and/or combinations thereof. For example, television content may be obtained via a coaxial cable in to the aggregator deployed as a set top box or router, and Internet content may be spidered or crawled from the web, or may be updated or directed from a central application server service in communication with the aggregator. Thus, method 700 can include obtaining television content (701A) and obtaining Internet media content (701B). Method 700 includes aggregating the television content and the other media content into aggregated content (702). For example, aggregator 610 can aggregate OTA content 641 ad OTT content 642 into aggregated content 646. Method 700 includes sending the aggregated content over a network to the device for presentation at the graphical user interface (703). For example, aggregator 610 can send aggregated content 646 over network 630 for presentation at a graphical user interface of device 601.

Method 700 includes determining a context for the device (704). For example, device 601 can send context data 647 to aggregator 610. Context data 647 can be information about user 651 and/or device 601, such as, for example, date, time, location, user preferences, social media connections, etc. From content data 647, aggregator 610 can determine a context for device 601 and/or user 651.

Method 700 includes accessing additional relevant services based on the context (705). For example, aggregator 610 can access relevant services 648 from data 651, such as, for example, advertisements, social media posts, calendar items, etc. that are relevant to user 651 and/or device 601.

Method 700 includes formulating an overlay from the additional relevant services (706). For example, aggregator 610 can formulate overlay 649 from relevant services 648. Method 700 includes sending the overlay to the device for presentation along with the aggregated content at the graphical user interface. For example, aggregator 610 can send overlay 649 to device 601 for presentation along with aggregated content 646 at a graphical user interface of device 601.

In one aspect, social media content may be displayed as an overlay, based on the particular media content that is current being played by a user or on a user device in communication with the aggregator, or by the aggregator in communication with a display. As an illustrative example, a Twitter feed for a TV show may be identified by its hashtag #tvshowname, and upon user direction or setting, new feeds having prematched criteria (i.e., only from users X Y Z or friends of the end user) may be displayed as an overlay when the end user is watching the respective TV show.

In one aspect, an advertisement may be displayed as an overlay, such as, for example, for an event that is occurring near the location of user 651 and/or device 601.

Advertisement content in advertisements 651 can be collected and populated on both local servers (for hotels and landlords should they choose this is necessary) and on cloud servers (for hotels/landlords as well as local and regional retailers). A platform and software can be provided to the retailers to create ads for the television and tablet. On the client side, the content aggregation permits retrieval and delivery as per business logic.

Targeted ads can be chosen based on location, time, and personal attributes of the travelers both past (such as spending habits) and present (such as today's viewing habits) and will be shown at app switching, unused television real estate while viewing when legally permissible, and during idle times of the television and tablet.

A fulfillment engine can allow a user to connect to the retailers if necessary, make the payment, and then arrange for delivery or pickup.

Other Individual components or elements of the system and method may be used interchangeably. The order of the method or processes described above may be arranged in any combination in various embodiments. In some embodiments, various steps may be omitted.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above.

The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to effect the operation of the method described above in a general purpose computer, a specialized computer or machine, as a software on chip, or as part of other integrated circuits or combination of circuitry and components.

Another Architecture

Figure 8:
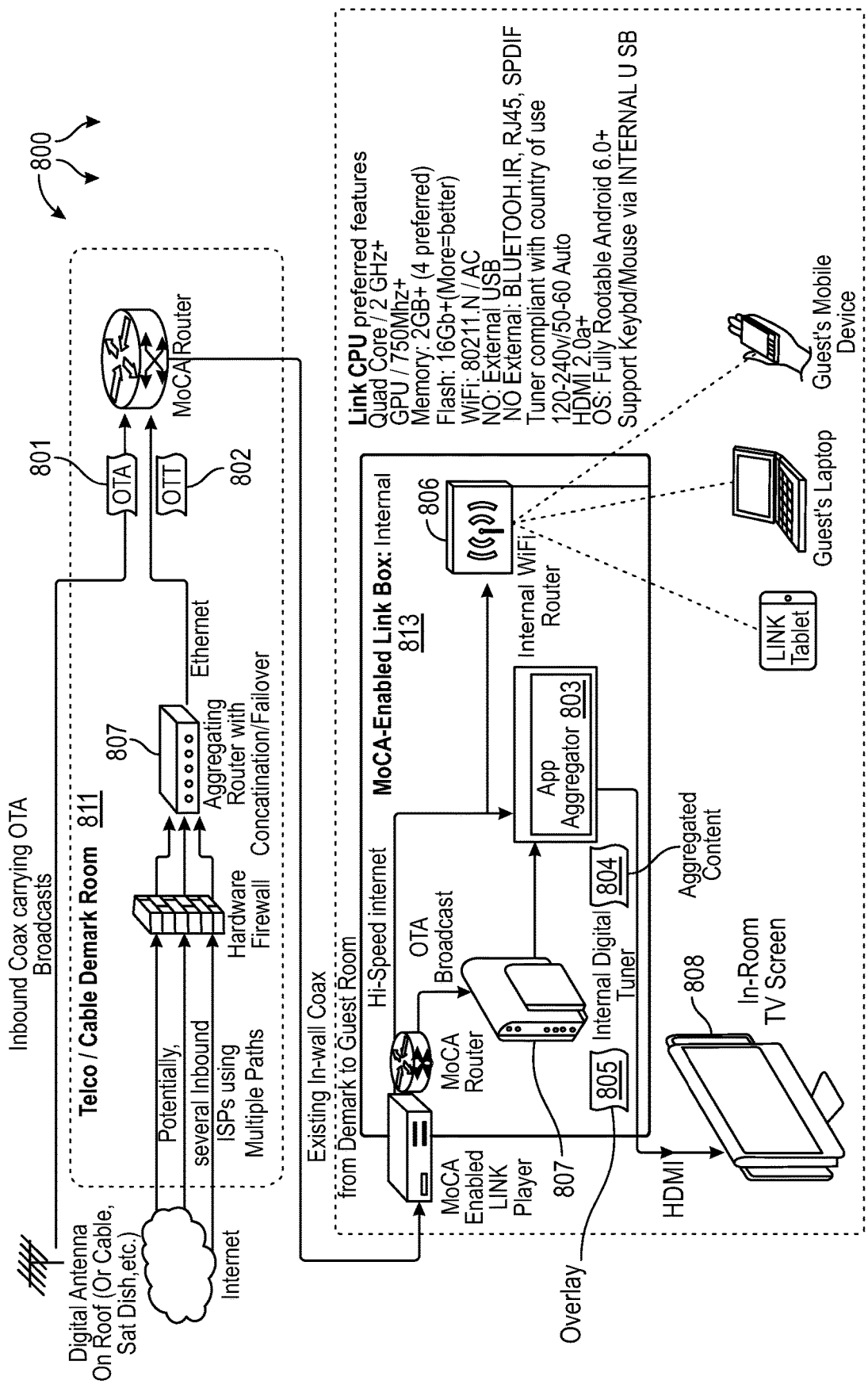
FIG. 8 illustrates an example architecture for overlaying other relevant services on aggregated media content along with providing wireless connectivity.

FIG. 8 illustrates an example architecture 800 for overlaying other relevant services on aggregated media content along with providing wireless connectivity. Within demarcation room 811, OTA content 801 can be received at a digital antenna. OTT content 802 as well as data for overlays can be received via one or more inbound Internet Service Providers (ISPs) from the Internet. Router 807 can aggregate OTT content from different ISPs into OTT content 802.

OTA content 801, OTT content 802, and data for overlays can be sent via coaxial cable to guest room 812 (e.g., in a hotel or dorm). At guest room 812, OTA content 801 can be routed to internal digital tuner 807. Internal digital tuner 807 can tune to a particular channel within OTA content 801. OTA content for the tuned channel can be sent to aggregator 803.

OTT content 802 as well as data for overlays can be routed to aggregator 803. Aggregator 803 can aggregate OTA content for the tuned channel and OTT content 802 into aggregated content 804. Aggregator 803 can send aggregated content 804 to in-room screen 808. In-room screen 808 can display aggregated content 804.

A tenant of room 812 can use a link tablet, laptop, or mobile device to wirelessly communicate with aggregator 803 through WiFi router 806. The tenant can send command to aggregator 803 to select content for aggregation, select links from a channel guide, etc. WiFi router 806 can also provide general wireless access for the link tablet, laptop, or mobile device (as well as other devices) to access the Internet.

Aggregator 803 can also derive a context for the tenant of room 812. Aggregator 803 can use the context to select relevant services (e.g., an advertisement, social media content, a calendar item, etc.) from the Internet for an overlay. Aggregator 803 can formulate overlay 805 from the relevant services. Aggregator 803 can send overlay 805 to in-room screen 808. In-room screen 808 can display overlay 805 along with aggregated content 804.

In this description and the following claims, Media over Coax Alliance ("MoCA") is defined as the international standards consortium publishing specifications for networking over coaxial cable, including MoCA 1.1, MoCA 2.0, and MoCA 2.5.

Figure 9:
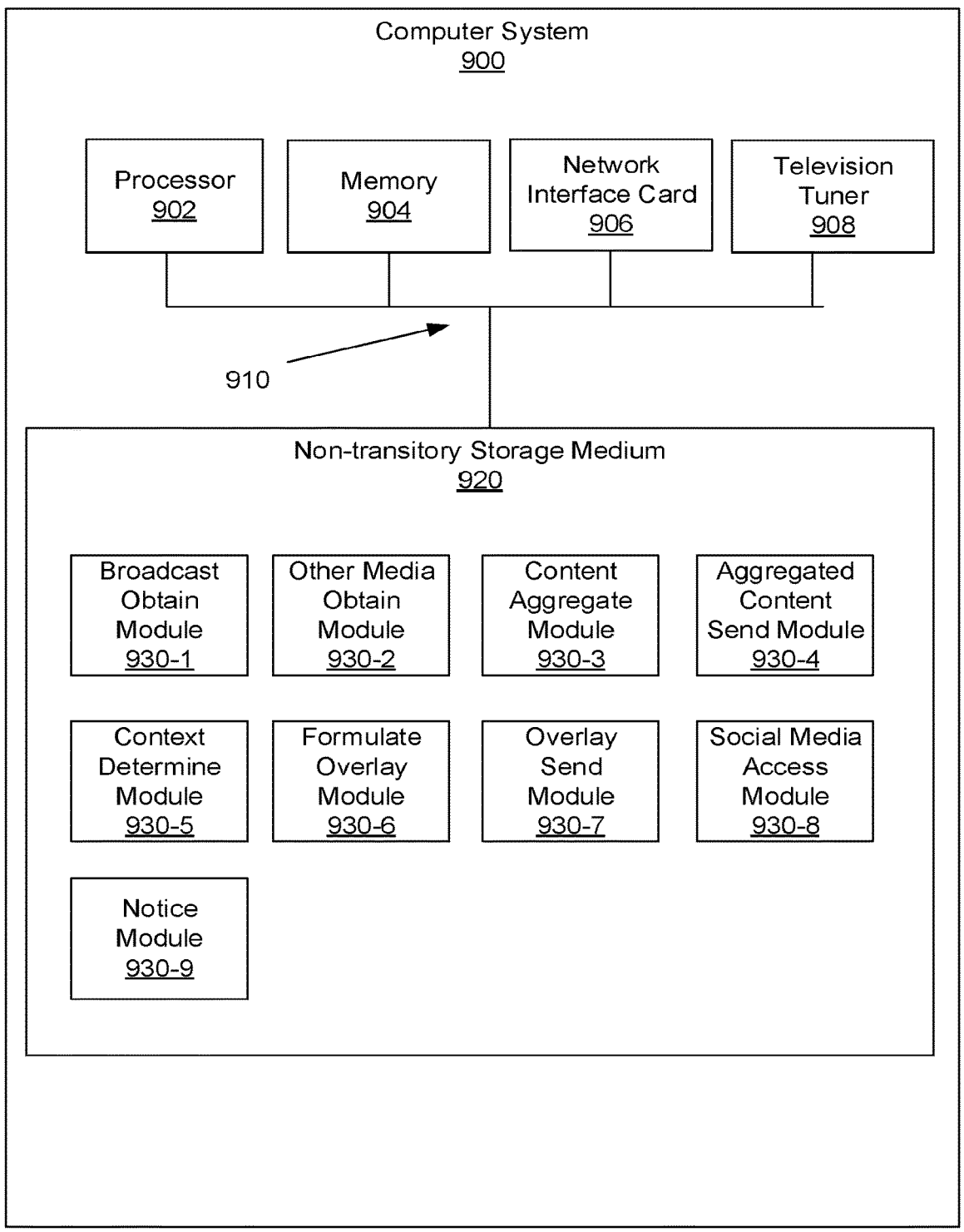
FIG. 9 illustrates an example of a schematic of the network enabled device manager and modules stored on a non-transitory storage medium.

FIG. 9 represents a computer system 900 for aggregating media content according to one example of the principles described herein. The computer system 900 includes a processor 902, memory 904, a network interface card 906, a television tuner 908, a memory bus 910, and a non-transitory storage medium 920. The non-transitory storage medium 920 includes a number of modules 930. Each module represents a combination of computer program code and hardware to cause the computer system 900 to perform a particular task. In this example, the non-transitory storage medium 920 includes a broadcast obtain module 930-1, and other media obtain module 930-2, a content aggregate module 930-3, and aggregated content send module 930-4, a context determine module 930-5, a formulate overlay module 930-6, an overlay send module 930-7, a social media access module 930-8, and a notice module 930-9.

The broadcast obtain module 930-1 obtains, from a broadcast source, the broadcast content. The broadcast obtain module may obtain broadcast content using an antenna or a television tuner to receive broadcast in content from a media broadcaster such as a television station, radio station, or satellite service provider.

The other media obtain module 930-2 obtains media content from a network related source. The other media obtain module 930-2 may obtain media using a network interface card 906. The other media obtain module 930-2 may obtain media from a locally stored resource such as the non-transitory storage medium 920.

The content aggregate module 930-3 aggregates broadcast content and other media content to create aggregated content. The aggregated content contains information related to a number of content providers.

The aggregated content send module 930-4 sends the aggregated content to a computing device associated with a user of the computer system 900. The aggregated content send module 930-4 may use the network interface card 906 to communicate with the user device. The network interface card 906 may use wired or wireless technology, including Wi-Fi or Bluetooth technology.

The context determine module 930-5 determines a context of the computer system 900. The context may include information about a user, a date, a time, or a location of the computer system 900. Additionally the context may include information regarding data stored on the computer system 900 or data about activity related to past activity of the computer system 900.

The formulate overlay module 930-6 formulates an overlay image for the aggregated content. The overlay image may include data identified or created by the context determine module 930-5.

The overlay send module 930-7 sends the overlay image to a user device with the aggregated content at a graphical user interface. The user device may then present this information to a user.

A social media access module 930-8 may access a number of social media networks to identify information about a user. The social media access module 930-8 may obtain information about a user's preferences, activities, personality, friends, or other information to inform the viewing pleasures of that user.

The notice module 930-9 may provide a user with notice of information from an administrator of the computer system 900. Such information may include emergency information, courtesy information, or advertisements. Advertisements displayed by the notice module 930-9 may be identified by the computer system 900 based on information obtained by the context determine module 930-5 and the social media access module 930-8.

Figure 10:
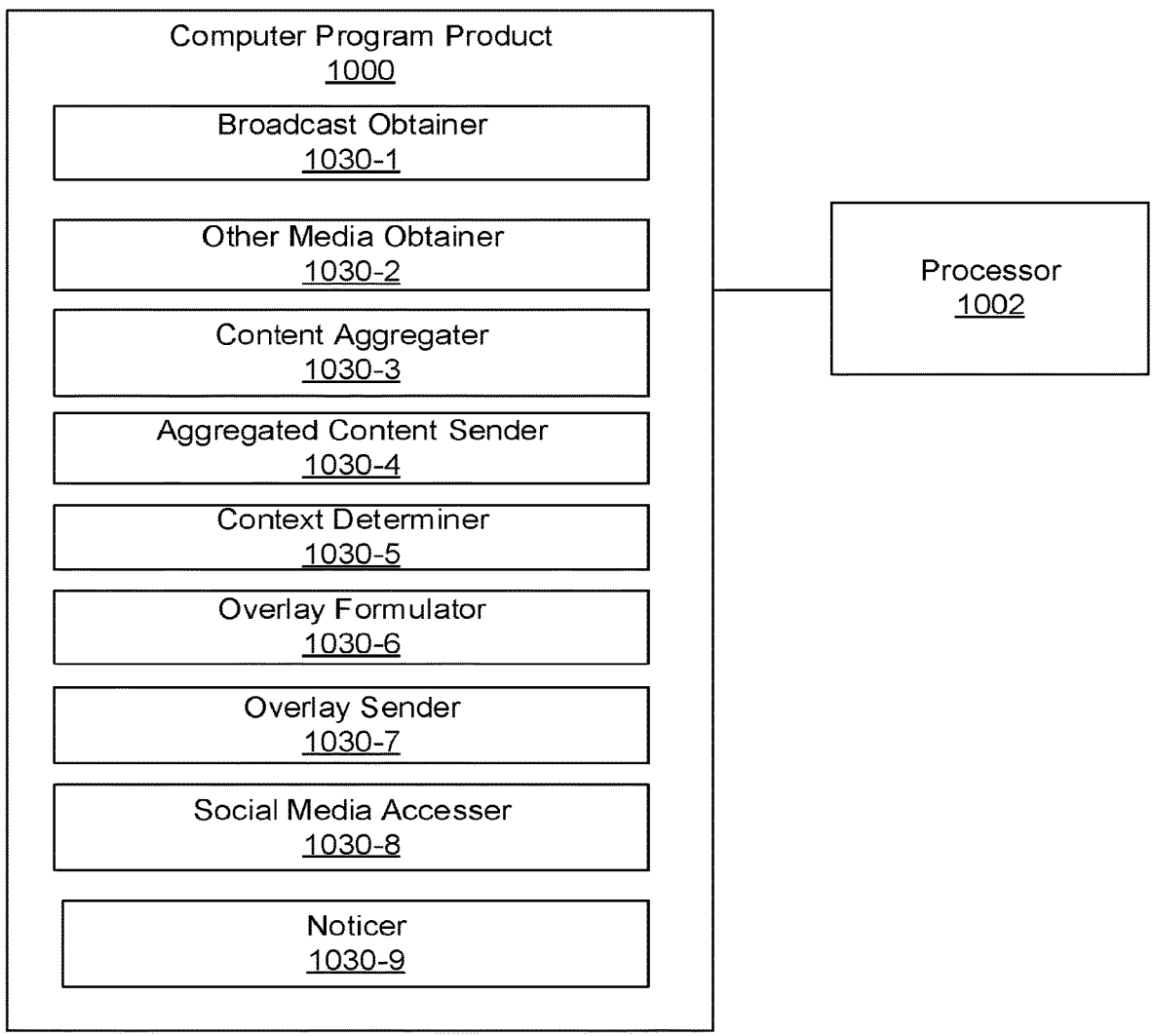
FIG. 10 illustrates an example of a computer program product.

FIG. 10 represents a computer program product 1000 for aggregating media content according to one example of the principles described herein. The computer program product 1000 is communicatively connected to a processor 1002. The computer program product 1000 causes the processor 1002 to perform a particular task. The computer program product 1000 includes a broadcast obtainer 1030-1, and other media obtainer 1030-2, a content aggregator 1030-3, and aggregated content sender 1030-4, a context determiner 1030-5, an overlay formulator 1030-6, an overlay sender 1030-7, a social media accessor 1030-8, and a noticer 1030-9.

The broadcast obtainer 1030-1 obtains broadcast content from a broadcast source. Obtaining content from a broadcast source may use an over-the-air signal to receive content from a broadcast provider. Obtaining content from a broadcast source may use cable services, satellite services, radio services, or other means to receive a signal from a broadcast provider.

The other media obtainer 1030-2 obtains other media content via a network protocol or locally stored content to make available for a user.

The content aggregator 1030-3 aggregates the content from the broadcast obtainer 1030-1 and the other media obtain or 1030-2 to create aggregated content.

The aggregated content sender 1030-3 sends the aggregated content to a user device. The aggregated content sender 1030-3 may use a network interface card, including a wireless network interface card, to communicate with a user device.

The context determiner 1030-5 determines the context of a computing device associated with the computer program product 1000. The context determiner 1030-5 may examine the time, date, location, and user of a computing device in determining the context of the computing device.

The overlay formulator 1030-6 formulates an overlay image to be presented with the aggregated media content. The overlay formulator 1030-6 may consider information from the context determiner 1030-5 in preparing the overlay image.

The overlay sender 1030-7 sends the overlay image to a computing device associated with a user.

The social media accessor 1030-8 may access a social media network to obtain information about a user of the computing device associated with the computer program product 1000. The social media accessor 1030-8 may obtain preferences, favorites, activity, beliefs, opinions, and personality information about a user of the computing device associated with the computer program product 1000.

The notice 1030-9 may provide a notice to a user of a computing device associated with the computer program product 1000. The notice 1030-9 may provide advertisement information to a user based on information obtained from the context determiner 1030-5 and the social media accessor 1030-8.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

The various components depicted in described computer architectures can be connected to (or be part of) a network, such as, for example, a system bus, a Local Area Network ("LAN"), a Wide Area Network ("WAN"), and even the Internet. Accordingly, the various components as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In some aspects, a computer system comprises one or more hardware processors and system memory. The one or more hardware processors execute instructions stored in the system memory to automatically perform any of the described functionality. In other aspects, computer implemented methods can be used to perform any of the described functionality. In further aspects, computer program products include computer-executable instructions, that when executed at a processor, cause a computer system to perform any of the described functionality.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope. Any headings are for convenience only and shall not be construed to limit the meaning of the application.

What is claimed:

1. A computer program product for aggregating content, the computer program product comprising:
   a computer readable recordable-type media having computer executable instructions stored thereon, the computer executable instructions comprising:
   computer executable instructions for a broadcast obtainer for obtaining broadcast content;
   computer executable instructions for an other media obtainer for obtaining other media content over an Internet via network communication;
   computer executable instructions for a content aggregator for aggregating the television content and the other media content into aggregated content;
   computer executable instructions for a selection creator for creating a number of selections selectable by a user;
   computer executable instructions for an aggregated content sender for sending the aggregated content over a network to the device for presentation at the graphical user interface;
   computer executable instructions for a context determiner for determining a context for the device and accessing at least one additional service relevant to the user based on the context for the user;
   computer executable instructions for an overlay formulator for formulating a partial overlay from additional relevant services;
   computer executable instructions for an overlay sender for sending the partial overlay to the device for presentation along with the aggregated content at the graphical user interface; and
   computer executable instructions for a selection receiver for receiving a number of selections from a user device.

2. The computer program product of claim 1, wherein the selection creator contains computer executable instructions for creating a number of selections within an application providing content to the computer program product.

3. The computer program product of claim 1, wherein the context determiner further contains computer executable instructions for accessing at least one additional service relevant to the user based on the context for the user.

4. A computer program product for aggregating content, the computer program product comprising:
a computer readable recordable-type media having computer executable instructions stored thereon, the computer executable instructions comprising:
computer executable instructions for a broadcast obtainer for obtaining broadcast content;
computer executable instructions for an other media obtainer for obtaining other media content over an Internet via network communication;
computer executable instructions for a content aggregator for aggregating the television content and the other media content into aggregated content;
computer executable instructions for a selection creator for creating a number of selections selectable by a user;
computer executable instructions for an aggregated content sender for sending the aggregated content over a network to the device for presentation at the graphical user interface;
computer executable instructions for a context determiner for determining a context for the device, wherein the context determiner further contains computer executable instructions for accessing at least one additional service relevant to the user based on the context for the user;
computer executable instructions for an overlay formulator for formulating a partial overlay from additional relevant services;
computer executable instructions for an overlay sender for sending the partial overlay to the device for presentation along with the aggregated content at the graphical user interface; and
computer executable instructions for a selection receiver for receiving a number of selections from a user device;
wherein the context determiner further contains computer executable instructions for accessing a calendar item for the user; wherein the computer executable instructions for the overlay formulator further comprises computer executable instructions for the formulate overlay module to formulate a partial overlay based on the calendar item.

5. The computer program product of claim 1, wherein the computer executable instructions for an overlay formulator for formulating a partial overlay from additional relevant services further comprises computer executable instructions for identifying at least one service relevant to the aggregated content to be viewed.

6. The computer program product of claim 5, further comprising computer executable code, stored on the computer readable recordable-type media, for a social media accessor accessing at least one additional service relevant to accessing social media content associated with the aggregated content.

7. The computer program product of claim 6, wherein identifying the notice uses a date, time, and location of the computer system.

8. The system of claim 7, wherein the notices provide information regarding at least one service available to the user.

* * * * *